United States Patent [19]

Kumamoto

[11] Patent Number: 5,265,249
[45] Date of Patent: Nov. 23, 1993

[54] INDIVIDUAL TASK ACCOUNTING FOR MULTIPROCESSOR SYSTEMS WHEN EXECUTING MULTITASK JOBS

[75] Inventor: Chiaki Kumamoto, Tokyo, Japan

[73] Assignee: NEC Corporation, Tokyo, Japan

[21] Appl. No.: 699,629

[22] Filed: May 15, 1991

[30] Foreign Application Priority Data

May 16, 1990 [JP] Japan ................. 2-125756

[51] Int. Cl.⁵ .............................................. G06F 11/34
[52] U.S. Cl. ...................... 395/650; 364/569;
364/221.7; 364/225; 364/DIG. 1
[58] Field of Search .............. 395/600, 650, 700, 575;
364/281, 569, 221.7, 225, 569, 401, 406

[56] References Cited

U.S. PATENT DOCUMENTS

| | | | |
|---|---|---|---|
| 4,432,051 | 2/1984 | Bogaert et al. | 395/650 |
| 4,589,093 | 5/1986 | Ippolito et al. | 395/550 |
| 4,677,580 | 6/1987 | Saluski | 395/275 |
| 4,720,778 | 1/1988 | Hall et al. | 395/575 |
| 4,815,030 | 3/1989 | Cross et al. | 395/650 |
| 5,193,179 | 3/1993 | Laprade et al. | 395/575 |

Primary Examiner—Gareth D. Shaw
Assistant Examiner—Dennis M. Butler
Attorney, Agent, or Firm—Foley & Lardner

[57] ABSTRACT

In a multiprocessor system, a table is created for each multitask job in the main memory. The table contains a first memory field for storing a task count value "m", second memory fields respectively identified by successive task count values for storing data respectively indicating the execution start times of "m" simultaneously executed tasks, and third memory fields respectively identified by successive task count values for storing the run times of "m" or more simultaneously executed tasks. In response to the roll-in of a given task, the task count value is incremented by 1, and real time data indicated by a system timer is stored into the second memory field identified by the task count value, allowing the selected task to be processed. At the end of the processing of any task, a difference is derived between real time data indicated by the system timer and an execution start time stored in the second memory field identified by the task count value. The difference is then added to a run time previously stored in the third memory field identified by the task count value, to produce a sum. This sum is stored back into the third memory field overwriting the previous run time. The task count value in the first memory field is decremented by 1 to allow the task to be rolled out. Differences are derived between run times stored in successive third memory fields.

3 Claims, 4 Drawing Sheets

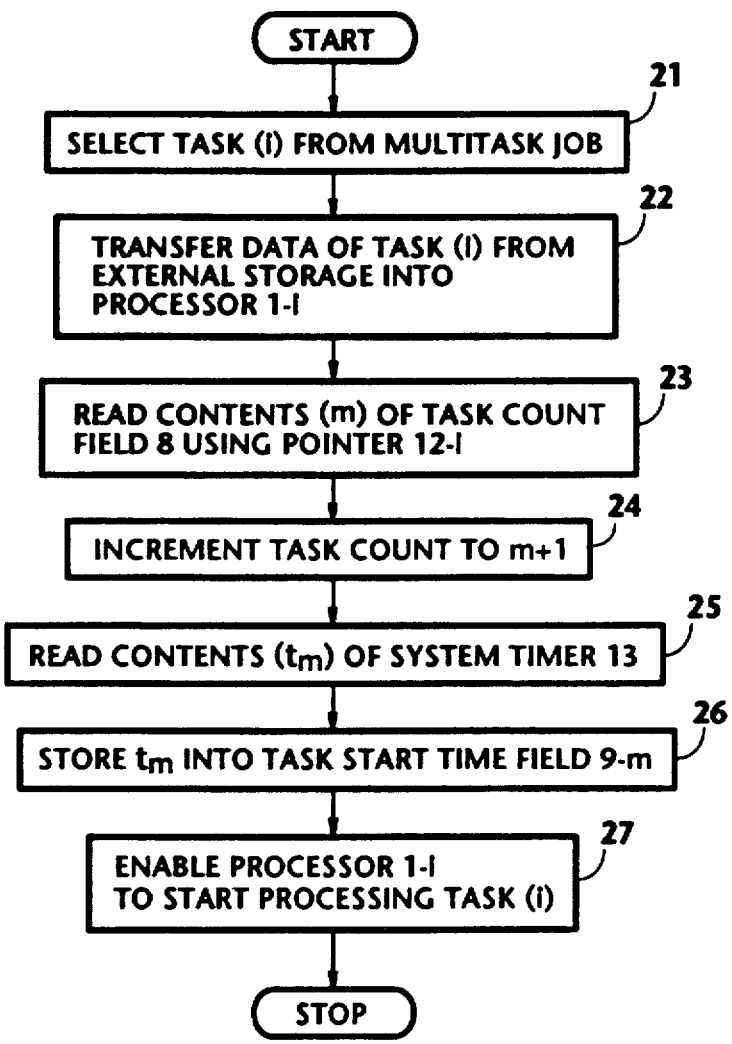

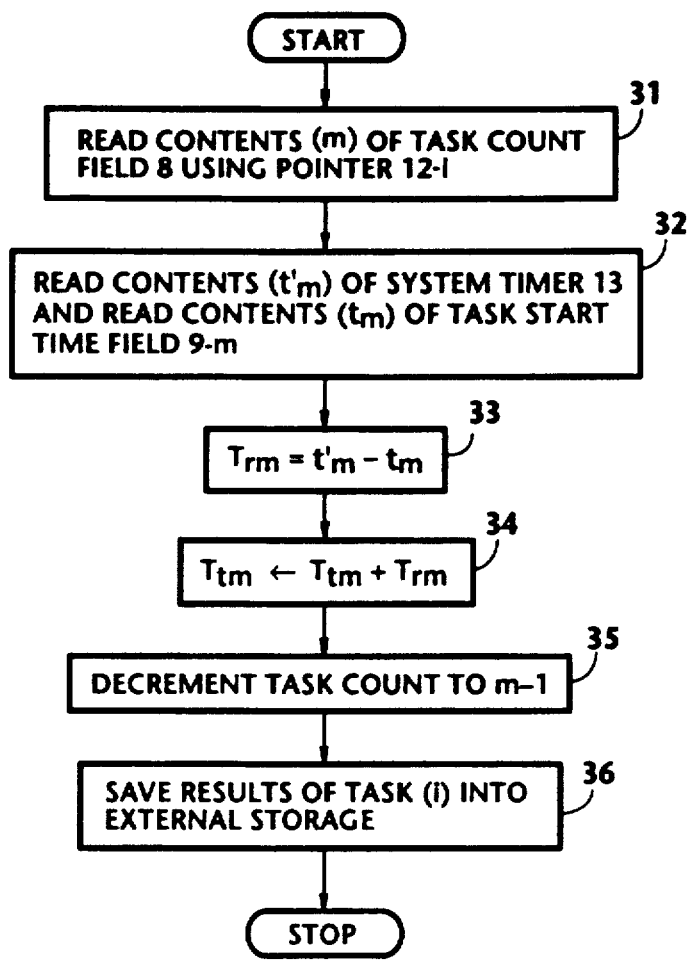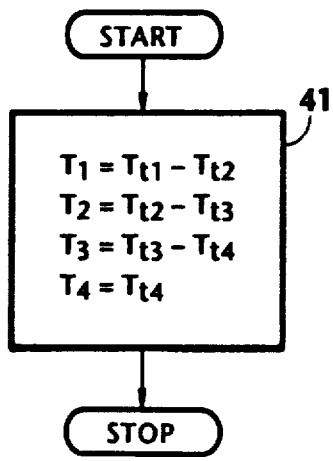

INDIVIDUAL TASK ACCOUNTING FOR MULTIPROCESSOR SYSTEMS WHEN EXECUTING MULTITASK JOBS

BACKGROUND OF THE INVENTION

The present invention relates generally to multiprocessor systems, and more specifically to the accounting of tasks of a multitask job.

With current multiprocessor systems, the run time of a user's job is measured and recorded for charging purposes. According to the current accounting method, each user's job is treated collectively as an accountable item. However, with the introduction of multitask jobs, the individual tasks of each multitask job are processed in a parallel mode by multiple processors. For the users' interest, however, it is desirable that the individual tasks of a multitask job be identified respectively for charging on a task-by-task basis.

SUMMARY OF THE INVENTION

It is therefore an object of the present invention to enable multiprocessor systems to make a billing on an individual task basis when processing a multitask job.

According to the present invention, there is provided a multiprocessor system having a plurality of processors which are run in a parallel mode for processing tasks of each of a plurality of multitask jobs, an external storage medium for storing task data, and a main memory. In the main memory is defined a table containing a first memory field for storing a task count value "m" and second memory fields which are respectively identified by successive task count values for storing data respectively indicating the execution start times of "m" simultaneously running tasks. Further defined in the table are third memory fields which are respectively identified by successive task count values for storing total values of run times of "m" -or-more simultaneously running tasks. A system controller transfers data of a selected task from the external storage medium into one of the processors. In response to the roll-in of the task data, the task count value "m" in the first memory field is incremented by 1, and real time data indicated by a system timer is stored into one of the second memory fields which is identified by the task count value. The execution of the selected task now begins. At the end of the execution of any task, a difference is derived between real time data indicated by the system timer and an execution start time stored in one of the second memory fields which is identified by the task count value. The difference is then summed with a run time previously stored in one of the third memory fields which is identified by the task count value to produce a sum, the sum being stored back into the third memory field overwriting the previous data, and the task count value in the first memory field is decremented by 1. The results of the execution of the task are saved into the external storage medium, and differences are derived between run times stored in successive third memory fields.

BRIEF DESCRIPTION OF THE DRAWINGS

The present invention will be described in further detail with reference to the accompanying drawings, in which:

FIG. 2 is a flowchart illustrating a task data roll-in program;

FIG. 3 is a flowchart illustrating a task data roll-out program;

FIG. 5 is a flowchart of a task accounting procedure.

DETAILED DESCRIPTION

Figure 1:
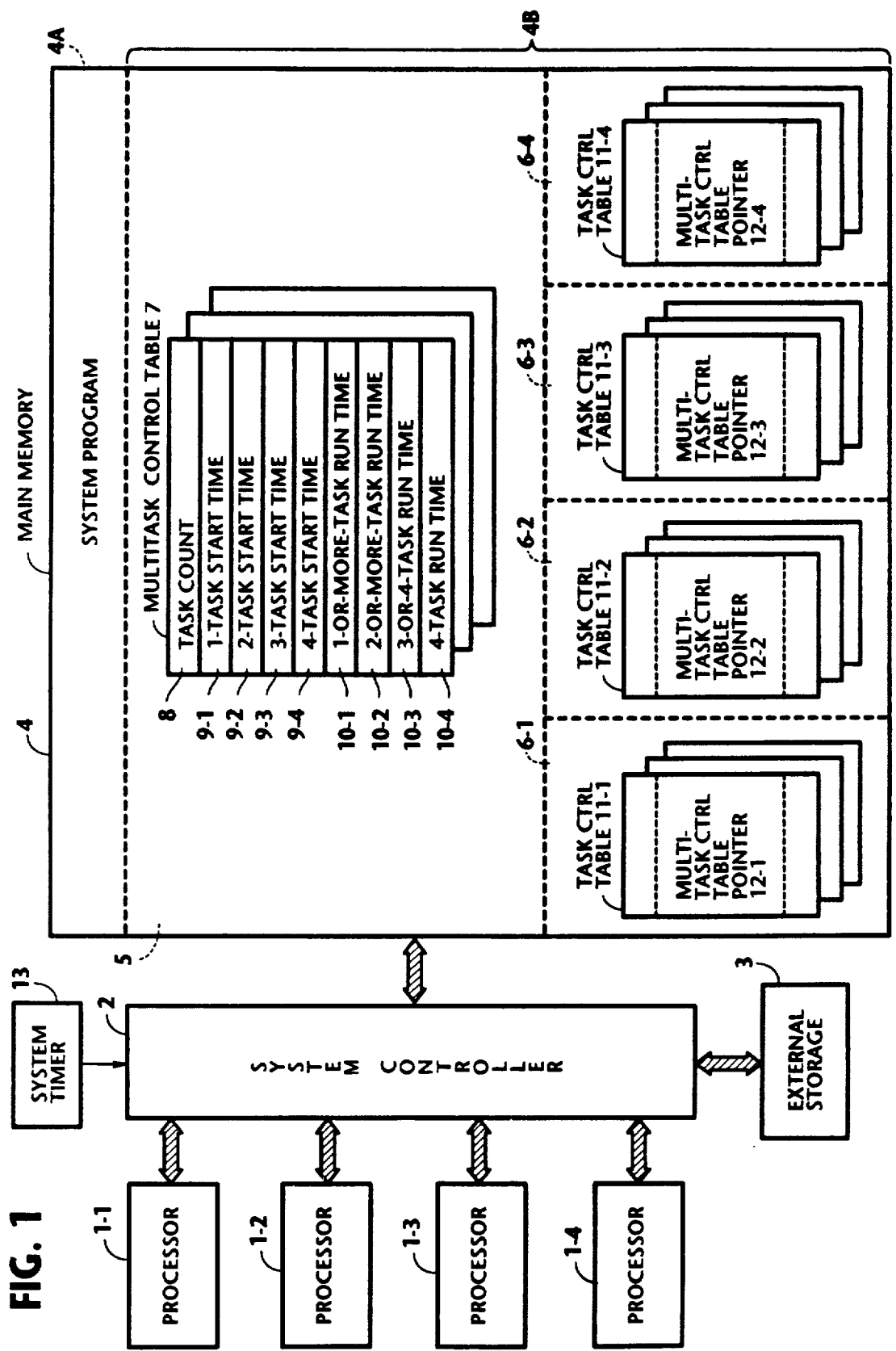
FIG. 1 is a block diagram of a multiprocessor system of this invention.

FIG. 1, is a multiprocessor system embodying the present invention. The system includes a plurality of processors 1-1 through 1-4, a system controller 2, an external storage 3 and a main memory 4. System controller 2 provides overall control for the system as well as control for accessing main memory 4.

Main memory 4 is divided into a system area 4A in which the system program is stored and a user area 4B which is further subdivided into a common area 5 and a plurality of individual task areas 6-1 through 6-4 corresponding respectively to processors 1-1 through 1-4. In the common storage area 5 is a plurality of multitask control tables 7 associated respectively with different multitask jobs. Each control table 7 comprises a task count field 8, a plurality of task start time memory fields 9-1–9-4 and a like plurality of task run time memory fields 10-1–10-4. More specifically, start time memory fields 9-1, 9-2, 9-3 and 9-4 store time data indicating respectively the starting times of a single task, two tasks, three tasks and four tasks, respectively, and task run time memory fields 10-1, 10-2, 10-3 and 10-4 store time interval data indicating the execution time continuously elapsed for one or more simultaneously running tasks, two or more simultaneously running tasks, three or four simultanously running tasks and four simultaneously running tasks, respectively.

As will be described, task count field 8 stores a count "m" indicating the number of tasks being simultaneously processed. When data of a given task is rolled into a processors 1-i, task count data "m" is incremented by one and a task start time field 9-m is accessed to store real time data indicated by a system timer 13.

Each task area 6-i (where i=1, 2, 3 or 4) contains a plurality of task control tables 11-i associated respectively with corresponding multitask jobs. In each task control table 11-i is a multitask control table pointer 12-i which is used to access the associated multitask control table 7.

For accounting purposes, system controller 2 is programmed to perform the instructions shown in FIGS. 2 and 3.

In FIG. 2, a task roll-in process begins with step 21 in which an appropriate task i is selected from a multitask job. Control exits to step 22 to transfer the data of task i from external storage 3 into processor 1-i. Using a multitask control table pointer 12-i, the contents (m) of task count field 8 are read (step 23) and the task count value m is incremented by one (step 24). Real time data ($t_m$) indicated by system timer 13 is then read (step 25) and stored into task start time field 9-m corresponding to the count given by task count field 8 (step 26). Processor 1-i is then enabled to start processing the task (step 27).

In FIG. 3, a task roll-out process with respect to task i begins with step 31 in which the task count value m is read from task count field 8 using pointer 12-i. Control proceeds to step 32 to read real time data $t'_m$ from timer 13 and start time data $t_m$ from task start time field 9-m which corresponds to the count m read out of task count field 8. A run time $T_{rm}$ for a task count value m is derived by taking a difference between $t'_m$ and $t_m$ (step 33). A total run time $T_{tm}$ for the count m is derived by adding the run time $T_{rm}$ to what is stored in a run time field 10-m which corresponds to the count m (step 34). The task count value m is then decremented by one (step 35). As a final stage of the roll-out process, the results of the task processing are saved into external storage 3 (step 36).

Figure 4:
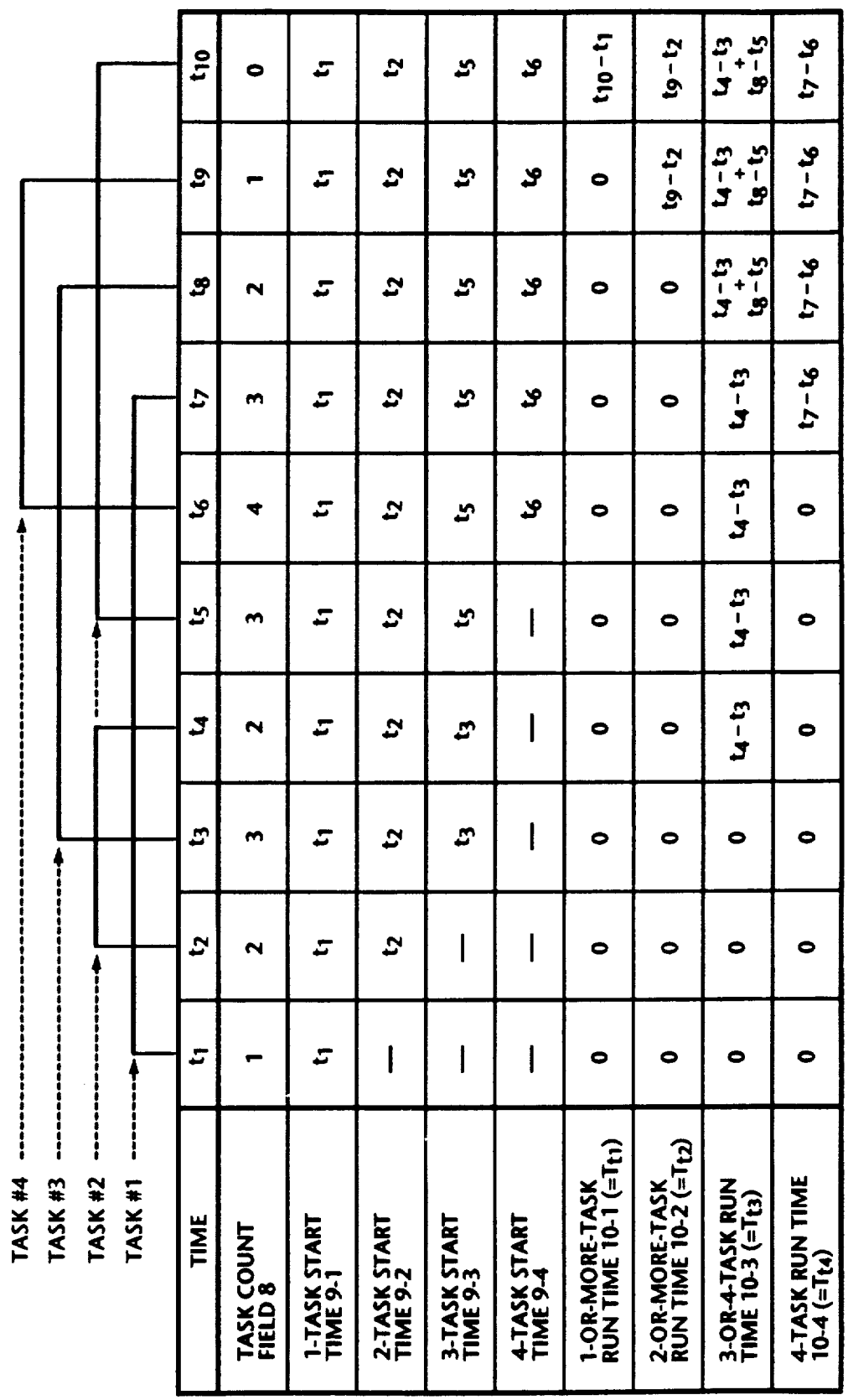
FIG. 4 is a table showing an example of data stored in a multitask control table of FIG. 1.

The operation of the present invention will be best understood with reference to FIG. 4. It is assumed that tasks #1, #2 and #3 are successively started at times $t_1$, $t_2$ and $t_3$, respectively. Task #1 is stopped at time $t_7$, and task #2 is stopped at time $t_4$ and restarted at time $t_5$ and stopped again at time $t_{10}$, and task #3 is stopped at time $t_8$. Task #4 is started at time $t_6$ and stopped at time $t_9$.

Initially, the task count in field 8 is zero. At time $t_1$, a roll-in process is executed on task #1 and task count field 8 is incremented to 1 (steps 21, 22, 23, 24) and time data $t_1$ is stored into task start time field 9-1 (steps 25, 26), allowing task #1 to be executed (step 27).

At time $t_2$, a roll-in process is executed on task #2 and task count field 8 is incremented to 2 (steps 21, 22, 23, 24) and time data $t_2$ is stored into task start time field 9-2 (steps 25, 26), allowing task #2 to be executed (step 27). In like manner, at time $t_3$, a roll-in process is executed on task #3 and task count field 8 is incremented to 3 (steps 21, 22, 23, 24) and time data $t_3$ is stored into task start time field 9-3 (steps 25, 26), allowing task #3 to be executed (step 27).

At time $t_4$, a roll-out process begins with respect to task #2 by reading the task count value "3" from task count field 8 using pointer 12-2 (step 31). Current time data $t_4$ is read from timer 13 and start time data $t_3$ is read from the 3-task start time field 9-3 which is identified by the count 3 (step 32) to derive a run time $T_{r3} = t_4 - t_3$ (step 33). The run time data $T_{rm}$ is stored as an initial value into the 3-or-4 task run time field 10-3 identified by the task count "3". The task count value is then decremented to "2" (step 35) and the results of task #2 are stored into external storage 3 (step 36).

At time $t_5$, a roll-in process begins with respect to task #2 by executing steps 21 and 22 and reading the task count value "2" and incrementing it to "3" (steps 23, 24). Current time data $t_5$ is stored into task start time field 9-32 corresponding to the task count "3" (step 26) and processor 1-2 is enabled to start processing task #2 (step 27). At time $t_6$, a roll-in process begins with respect to task #4 and a task count value "3" is read from task count field 8 and incremented to "4". Current time data $t_6$ is stored into task start time field 9-4 corresponding to the task count "4" (step 26) and processor 1-4 is enabled to start processing task #4 (step 27).

At time $t_7$, a roll-out process begins with respect task #1 by reading the task count value "4" from task count field 8 using pointer 12-1 (step 31). Current time data $t_7$ is read from timer 13 and start time data $t_6$ is read from the 4-task start time field 9-4 which is identified by the count 4 (step 32) to derive a run time $T_{r4} = t_7 - t_6$ (step 33). The run time data $T_{r4}$ is stored as an initial total run time value $T_{t4}$ into the 4 task run time field 10-4 which is also identified by the task count "4". The task count value is then decremented to "3" (step 35) and the results of task #1 are stored into external storage 3 (step 36).

At time $t_8$, a roll-out process begins with respect task #3 by reading the task count value "3" from task count field 8 using pointer 12-3 (step 31). Current time data $t_8$ is read from timer 13 and start time data $t_5$ is read from the 3-task start time field 9-3 which is identified by the count 3 (step 32) to derive a run time $T_{r3} = t_8 - t_5$ (step 33). The run time data $t_8 - t_5$ is summed with the value $t_4 - t_3$ initially stored in the 3-or-4-task run time field 10-3 which is identified by the count "3" and the sum $(t_4 - t_3) + (t_8 - t_5)$ is stored back into the field 10-3 as total run time data $T_{t3}$. The task count value is then decremented to "2" (step 35) and the results of task #3 are stored into external storage 3 (step 36).

At time $t_9$, a roll-out process begins with respect task #4 by reading the task count value "2" from task count field 8 using pointer 12-4 (step 31). Current time data $t_9$ is read from timer 13 and start time data $t_2$ is read from the 2-task start time field 9-2 which is identified by the count 2 (step 32) to derive a run time $T_{r2} = t_9 - t_2$ (step 33). The run time data $T_{r2}$ is stored as total run time $T_{t2}$ into the 2-or-more-task run time field 10-2 which is identified by the count "2". The task count value is then decremented to "1" (step 35) and the results of task #4 are stored into external storage 3 (step 36).

At time $t_{10}$, a roll-out process begins with respect task #2 by reading the task count value "1" from task count field 8 using pointer 12-2 (step 31). Current time data $t_{10}$ is read from timer 13 and start time data $t_1$ is read from the 1-task start time field 9-1 which is identified by the count 1 (step 32) to derive a run time $T_{r1} = t_{10} - t_1$ (step 33). The run time data $T_{r1}$ is stored as total run time data $T_{t1}$ into the 1-or-more-task run time field 10-1 which is also identified by the task count value "1", which is then decremented to "0" (step 35), and the results of task #2 are stored into external storage 3 (step 36).

In this way, total run times $T_{t1}(=t_{10}-t_1=9t)$, $T_{t2}(=t_9-t_2=7t)$, $T_{t3}(=t_4-t_3+t_8-t_5=4t)$, and $T_{t4}(=t_7-t_6=t)$ are obtained for simultaneous executions of one or more tasks, two or more tasks, three or four tasks and four tasks, respectively (where t is a unit time interval).

In FIG. 5, the total run times so obtained in a manner as described above are used to derive total run times $T_1$, $T_2$, $T_3$ and $T_4$ for executions of one task, two tasks, three tasks, and four tasks, respectively. In calculation step 41, $T_1$ is obtained by subtracting $T_{t2}$ from $T_{t1}$, $T_2$ by subtracting $T_{t3}$ from $T_{t2}$, and $T_3$ by subtracting $T_{t4}$ from $T_{t3}$. $T_{t4}$ is set equal to $T_4$. In the example of FIG. 4, the following run times are obtained:

$$T_1 = T_{t1} - T_{t2} = 9t - 7t = 2t$$

$$T_2 = T_{t2} - T_{t3} = 7t - 4t = 3t$$

$$T_3 = T_{t3} - T_{t4} = 4t - t = 3t$$

$$T_4 = T_{t4} = t$$

The foregoing description shows only one preferred embodiment of the present invention. Various modifications are apparent to those skilled in the art without departing from the scope of the present invention which is only limited by the appended claims.

What is claimed is:

1. A multiprocessor system having a plurality of processors executing tasks of each of a plurality of multitask jobs in a parallel mode, and an external storage medium for storing task data, the system comprising:

timer means for generating real time data indicating current time;

a main memory including a first memory field for storing a task count value "m" where "m" indicates the number of tasks being simultaneously executed, second memory fields identified by said task count value "m" for storing execution start times respectively indicating the start times of individual tasks, and third memory fields identified by said task count value for storing run times of "m" or more tasks; and a controller connected to said external storage medium and said processors for transferring data of a selected task from the external storage medium into one of the processors and incrementing the task count value in the first memory field by 1 when execution of the selected task is started by said one of the processors, such that there is no more than one task having a same task count value, said controller being connected to said timer means and said main memory for storing real time data indicated by the timer means into one of the second memory fields identified by the task count value as an execution start time of the selected task, deriving a difference between real time data currently indicated by the timer means and an execution start time stored in one of the second memory fields which is identified by the task count value when said one of the processors ends the execution of said task, storing the difference into one of the third memory fields which is identified by said task count value as a run time of "m" or more tasks if there is no run time previously stored therein, summing the difference with a run time previously stored therein to produce a sum, overwriting the previously stored run time with the sum, decrementing the task count value by 1, and deriving differences between run times stored in successive ones of the third memory fields.

2. A multiprocessor system as claimed in claim 1, wherein said first, second and third memory fields are provided for each of said multitask jobs.

3. In a multiprocessor system comprising a plurality of processors executing tasks of each of a plurality of multitask jobs in a parallel mode, and an external storage medium for storing task data, timer means for generating real time data indicating current time, and a main memory indicating a first memory field for storing a task count value "m" where "m" indicates the number of tasks being simultaneously executed, second memory fields respectively identified by successive task count values "m" of the first memory field for storing execution start times respectively indicating the start times of individual tasks, and third memory fields respectively identified by successive task count values of the first memory field for storing run times of "m" or more tasks, there being no more than one task having a same task count value, a method comprising the steps of:

(a) incrementing the task count value "m" in the first memory field by 1 if data related to a task is transferred from said external storage medium into one of said processors;

(b) storing real time data indicated by the timer means into one of the second memory fields identified by the task count value as an execution start time;

(c) if the data for said task is transferred out of said one of the processors, deriving a difference between real time data indicated by the timer means and an execution start time stored in one of the second memory fields which is identified by the task count value, storing the difference into one of the third memory fields which is identified by the task count value as a run time of "m" or more tasks if there is no run time previously stored therein, summing the difference with a run time previously stored therein, and overwriting the previously stored run time with the sum;

(d) decrementing the task count value "m" in the first memory field by 1;

(e) repeating steps (a) to (d); and (f) deriving differences between run times stored in successive ones of the third memory fields.

* * * * *